United States Patent
Sugimoto

(10) Patent No.: US 9,049,350 B2
(45) Date of Patent: Jun. 2, 2015

(54) IMAGING APPARATUS THAT TRANSMITS MEDIA DATA TO RECEPTION APPARATUS, METHOD OF PROCESSING INFORMATION, AND STORAGE MEDIUM

(71) Applicant: CANON KABUSHIKI KAISHA, Tokyo (JP)

(72) Inventor: Shun Sugimoto, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 171 days.

(21) Appl. No.: 13/854,273

(22) Filed: Apr. 1, 2013

(65) Prior Publication Data
US 2013/0258120 A1 Oct. 3, 2013

(30) Foreign Application Priority Data

Apr. 2, 2012 (JP) .................................. 2012-084252

(51) Int. Cl.
| | | |
|---|---|---|
| H04N 7/173 | (2011.01) | |
| H04N 7/18 | (2006.01) | |
| H04L 29/06 | (2006.01) | |
| H04N 21/218 | (2011.01) | |
| H04N 7/16 | (2011.01) | |
| G06F 15/16 | (2006.01) | |

(52) U.S. Cl.
CPC ............ *H04N 7/181* (2013.01); *H04L 65/1006* (2013.01); *H04L 65/4084* (2013.01); *H04L 65/80* (2013.01); *H04N 21/21805* (2013.01)

(58) Field of Classification Search
CPC .............. H04N 7/173; H04N 7/17309; H04N 7/17318; H04N 5/225; H04N 5/23207; H04N 5/23206; H04N 21/4223
USPC .............. 725/105, 25, 59, 114, 119; 709/203–204, 217
See application file for complete search history.

(56) References Cited

U.S. PATENT DOCUMENTS

| | | | |
|---|---|---|---|
| 6,239,836 B1 | 5/2001 | Suzuki et al. | |
| 6,772,191 B1 * | 8/2004 | Kurosawa et al. | 709/203 |
| 8,744,232 B2 * | 6/2014 | Lee | 386/224 |
| 2003/0214400 A1 * | 11/2003 | Mizutani et al. | 340/531 |
| 2009/0172754 A1 * | 7/2009 | Furukawa | 725/91 |
| 2012/0150795 A1 * | 6/2012 | Sasaki | 707/609 |
| 2013/0057639 A1 * | 3/2013 | Ralston | 348/14.02 |

FOREIGN PATENT DOCUMENTS

| | | |
|---|---|---|
| JP | 10-164559 A | 6/1998 |
| JP | 2009-071538 A | 4/2009 |
| JP | 2009-260569 A | 11/2009 |

* cited by examiner

*Primary Examiner* — Kelly L Jerabek
(74) *Attorney, Agent, or Firm* — Rossi, Kimms & McDowell LLP

(57) ABSTRACT

An imaging apparatus connected to another imaging apparatus and a reception apparatus via a network. A reception section receives a transmission request requesting transmission of first video data photographed by the imaging apparatus to the reception apparatus, from the reception apparatus. A determination section determines, based on processing load on the imaging apparatus, a distribution capacity of the imaging apparatus, or conditions of the network, whether or not the imaging apparatus is to execute transmission processing for transmitting the first video data to the reception apparatus. An acquisition section acquires, in a case where the determination section has determined that the imaging apparatus is not to execute the transmission processing, a transmission destination to which a request for acquiring second video data photographed by said another imaging apparatus is to be transmitted.

9 Claims, 12 Drawing Sheets

IMAGING APPARATUS THAT TRANSMITS MEDIA DATA TO RECEPTION APPARATUS, METHOD OF PROCESSING INFORMATION, AND STORAGE MEDIUM

BACKGROUND OF THE INVENTION

1. Field of the Invention

The present invention relates to an imaging apparatus, a method of processing information, and a storage medium.

2. Description of the Related Art

Today, media transmission using an IP network, such as the Internet, is widely used. Further, RTP, which is a protocol for transmitting media data, such as data of moving images taken by a camera or the like, and audio data, in real time via a network, has come to be used. Here, IP is an abbreviation for "Internet Protocol", and RTP is an abbreviation for "Real-time Transport Protocol".

Further, as one manner of use of media data transmission, a transmission apparatus equipped with a server function for transmitting media data, as typified by a live camera or a monitoring camera, is requested to transmit media data, by a plurality of reception apparatuses. Furthermore, there is also a manner of use of media data transmission, in which, to obtain videos from different angles or to provide a substitute in case of failure, a plurality of data transmission apparatuses shoot videos of the same object to be shot, and transmit the shot video data to a data reception apparatus.

In the real-time transmission of media data, to maintain the quality of media data during playback by the data reception apparatuses, it is required to perform control, such as limiting of the number of connections of data reception apparatuses, by taking into account processing load on the data transmission apparatus and load on the network. Conventionally, as a method of limiting the number of connections of data reception apparatuses, a technique has been disclosed in Japanese Patent Laid-Open Publication NO. H10-164559 in which the maximum number of connections is set in advance as a threshold value, and connection requests exceeding the threshold value are rejected.

Further, there has been disclosed in Japanese Patent Laid-Open Publication NO. 2009-071538 a technique which causes each data reception apparatus itself to have a data transfer function and transfer data in consideration of the tree structure of the network, thereby making it possible to transmit media data to a large number of data reception apparatuses while reducing the processing load and the load on the network.

However, in the conventional method of limiting the number of connections of data reception apparatuses, even if a plurality of data transmission apparatuses are provided, when a data transmission apparatus having received a connection request has already been connected to the upper limit number of data reception apparatuses, the data transmission apparatus rejects the requested connection, even if another data transmission apparatus can transmit media data. Therefore, to make the most of the resources of the data transmission apparatuses, a data reception apparatus is required to grasp in advance the presence of the plurality of data transmission apparatuses, and when a connection request is rejected, the data reception apparatus is required to retransmit the connection request to other data transmission apparatuses.

Further, the technique for transferring media data between data reception apparatuses suffers from the problem that a data reception apparatus is required not only to grasp the network structure of the other data reception apparatuses but also to be equipped with a data transfer function.

SUMMARY OF THE INVENTION

The present invention enables reception apparatuses to make efficient use of resources without grasping the network structure of a plurality of imaging apparatuses.

In a first aspect of the present invention, there is provided an imaging apparatus connected to another imaging apparatus and a reception apparatus via a network, comprising a reception section configured to receive a transmission request requesting transmission of first video data photographed by the imaging apparatus to the reception apparatus, from the reception apparatus, a determination section configured to determine, based on processing load on the imaging apparatus, a distribution capacity of the imaging apparatus, or conditions of the network, whether or not the imaging apparatus is to execute transmission processing for transmitting the first video data to the reception apparatus, and an acquisition section configured to acquire, in a case where the determination section has determined that the imaging apparatus is not to execute the transmission processing, a transmission destination to which a request for acquiring second video data photographed by said another imaging apparatus is to be transmitted.

In a second aspect of the present invention, there is provided an imaging apparatus connected to a reception apparatus and an information processing apparatus via a network, comprising a reception section configured to receive an output request requesting the imaging apparatus to output audio data, from the reception apparatus, a determination section configured to determine whether or not to the imaging apparatus is to execute output processing for outputting the audio data according to the output request, and an acquisition section configured to acquire, in a case where the determination section determines that the imaging apparatus is not to execute the output processing according to the output request, a transmission destination to which a request for causing the information processing apparatus to output audio data is to be transmitted.

In a third aspect of the present invention, there is provided a method of processing information by an imaging apparatus connected to another imaging apparatus and a reception apparatus, via a network, comprising receiving a transmission request requesting transmission of first video data photographed by the imaging apparatus to the reception apparatus, from the reception apparatus, determining, based on processing load on the imaging apparatus, a distribution capacity of the imaging apparatus, or conditions of the network, whether or not the imaging apparatus is to execute transmission processing for transmitting the first video data to the reception apparatus, and acquiring, in a case where said determining has determined that the imaging apparatus is not to execute the transmission processing, a transmission destination to which a request for acquiring second video data photographed by said another imaging apparatus is to be transmitted.

In a fourth aspect of the present invention, there is provided method of processing information by an imaging apparatus connected to another imaging apparatus and a reception apparatus, via a network, comprising receiving an output request requesting the imaging apparatus to output audio data, from the reception apparatus, determining whether or not to the imaging apparatus is to execute output processing for outputting the audio data according to the output request, and acquiring, in a case where said determining has determined that the imaging apparatus is not to execute the output processing according to the output request, a transmission destination to which a request for causing the information processing apparatus to output audio data is to be transmitted.

In a fifth aspect of the present invention, there is provided a non-transitory computer-readable storage medium storing a computer-executable program for causing a computer to execute a method of processing information by an imaging apparatus connected to another imaging apparatus and a reception apparatus, via a network, wherein the method comprises receiving a transmission request requesting transmission of first video data photographed by the imaging apparatus to the reception apparatus, from the reception apparatus, determining, based on processing load on the imaging apparatus, a distribution capacity of the imaging apparatus, or conditions of the network, whether or not the imaging apparatus is to execute transmission processing for transmitting the first video data to the reception apparatus, and acquiring, in a case where said determining has determined that the imaging apparatus is not to execute the transmission processing, a transmission destination to which a request for acquiring second video data photographed by said another imaging apparatus is to be transmitted.

In a sixth aspect of the present invention, there is provided a non-transitory computer-readable storage medium storing a computer-executable program for causing a computer to execute a method of processing information by an imaging apparatus connected to another imaging apparatus and a reception apparatus, via a network, wherein the method comprises receiving an output request requesting the imaging apparatus to output audio data, from the reception apparatus, determining whether or not to the imaging apparatus is to execute output processing for outputting the audio data according to the output request, and acquiring, in a case where said determining has determined that the imaging apparatus is not to execute the output processing according to the output request, a transmission destination to which a request for causing the information processing apparatus to output audio data is to be transmitted.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

A system configuration including a transmission apparatus as an imaging apparatus and a reception apparatus, common to embodiments of the present invention, will be described with reference to FIG. 1.

Figure 1:
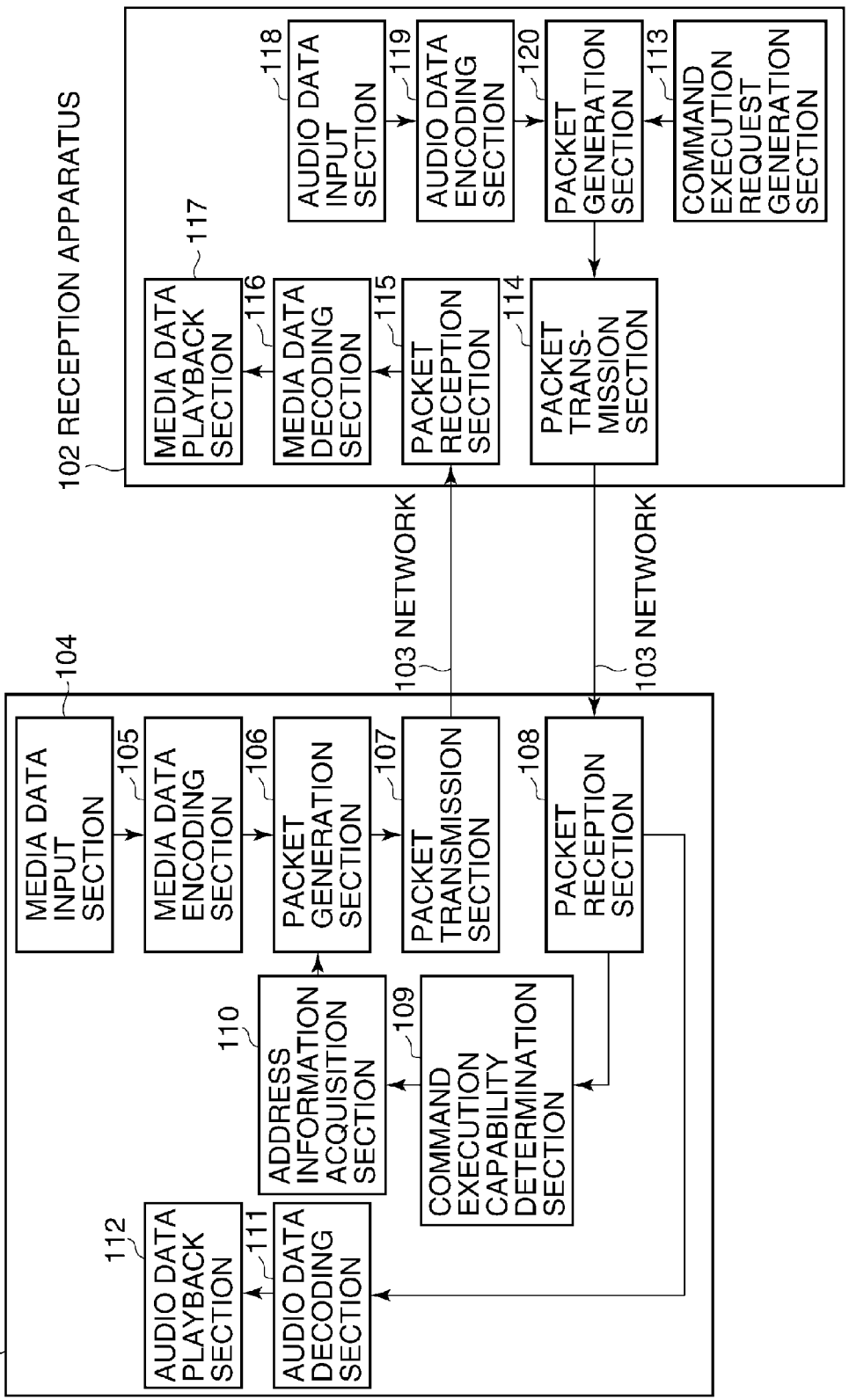
FIG. 1 is a diagram showing a system configuration including a transmission apparatus as an imaging apparatus and a reception apparatus, common to embodiments of the present invention.

In FIG. 1, the transmission apparatus, denoted by reference numeral 101, may be realized by a single or a plurality of computers equipped with a communication function for transmitting media data or may be a camera equipped with the communication function.

The reception apparatus, denoted by reference numeral 102, may be realized by a computer equipped with a communication function for receiving media data transmitted from the transmission apparatus 101 or a storage apparatus or a television equipped with the communication function. The transmission apparatus 101 and the reception apparatus 102 are connected by a network 103 such that they can communicate with each other.

Figure 2:
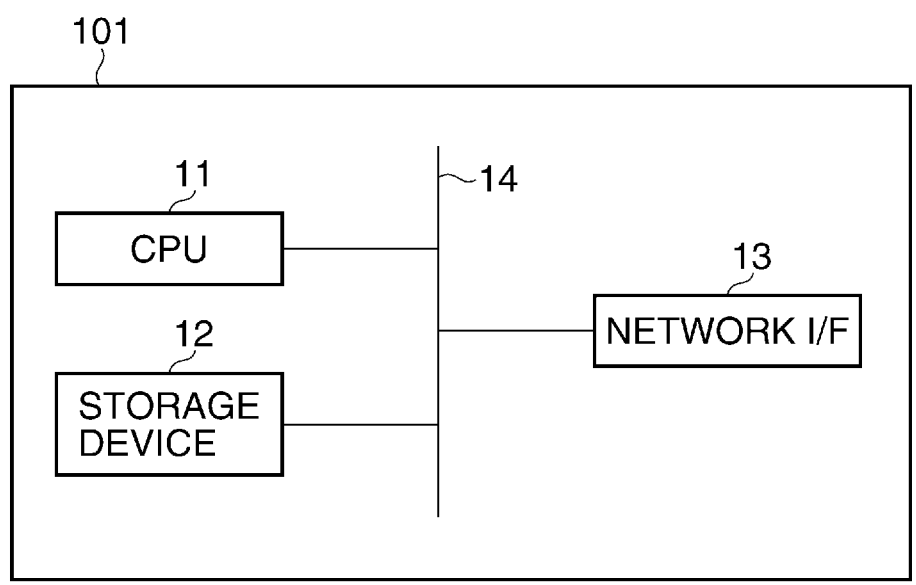
FIG. 2 is a diagram of an example of the hardware configuration of the transmission apparatus.

The transmission apparatus 101 comprises a media data input section 104, a media data encoding section 105, a packet generation section 106, a packet transmission section 107, a packet reception section 108, a command execution capability determination section 109, and an address information acquisition section 110, as functional components. The transmission apparatus 101 further comprises an audio data decoding section 111 and an audio data playback section 112 as functional components. Note that the transmission apparatus 101 is not required to include the audio data decoding section 111 and the audio data playback section 112 as functional components. Each functional component may be mounted on the transmission apparatus 101 as hardware, or may be mounted on the transmission apparatus 101 as software which is executed for realization of the functional component by a CPU based on a program stored in a storage device. In the present embodiment, however, the description will be given assuming that as shown in FIG. 2, referred to hereinafter, each functional component illustrated in FIG. 1 is mounted on the transmission apparatus 101 as the software which is executed for realization of the functional component by the CPU based on the program stored in the storage device.

First, a description will be given of a general flow of processing executed by the transmission apparatus 101.

The media data input section 104 receives video data and audio data to be transmitted via the network 103 from a storage apparatus or a video sensor and an audio sensor provided in a video camera and a network camera, respectively, converts the video data and the audio data to digital signals, and inputs the digital signals to the media data encoding section 105 as media data.

The media data encoding section 105 encodes the input media data according to a compression encoding method. Examples of the compression encoding method include H.264/AVC and Motion-JPEG for encoding video data, and G.711 and G.726 for encoding audio data. Video data and audio data may be encoded by compression encoding methods other than the above. Encoded media data are input to the packet generation section 106.

The packet generation section 106 divides the encoded media data into optimum packets for communication. In a case where RTP (Real-time Transport Protocol) is employed as a communication protocol, in general, RTP packets of approximately 1500 bytes are generated. The generated media data packets are input to the packet transmission section 107.

The packet transmission section 107 transmits the generated media data packets to the reception apparatus 102 via the network 103.

The packet reception section 108 receives packets transmitted from the reception apparatus 102 via the network 103. The packets received by the packet reception section 108 include command execution information which is information on command execution requested by the reception apparatus 102. Here, the command execution information includes e.g. a media data transmission request which requests the transmission apparatus 101 to transmit media data. Further, the command execution information includes an output request which requests the transmission apparatus 101 to output audio data generated by the reception apparatus 101. In the present embodiment, a case where the command execution information is a media data transmission request will be described, by way of example.

The command execution capability determination section 109 determines whether or not a command requested by the reception apparatus 102 can be executed. A method of the determination will be described hereinafter. Information on the determination is notified from the packet transmission section 107 to the reception apparatus 102. Although a method of the notification is realized by using RTSP, SIP, or the like, as a session control protocol, another method may be used. In the present embodiment, the method using RTSP will be described. Here, RTSP is an abbreviation for "Real Time Streaming Protocol". Further, SIP is an abbreviation for "Session Initiation Protocol".

If it is determined that the command requested by the reception apparatus 102 cannot be executed, the address information acquisition section 110 acquires an IP address of a second transmission apparatus connected to the network 103. The packet generation section 106 generates media session information including the IP address of the second transmission apparatus, acquired by the address information acquisition section 110. The packet transmission section 107 transmits the generated media session information to the reception apparatus 102. The media session information will also be described hereinafter.

The audio data decoding section 111 decodes audio data transmitted from the reception apparatus 102.

The decoded audio data is output from the audio data playback section 112 to audio devices, such as speakers or earphones, for playback.

Next, a description will be given of a general flow of processing executed by the reception apparatus 102.

A command execution request generation section 113 generates a command execution request. A packet generation section 120 packetizes the command execution request. A packet transmission section 114 transmits the packetized command execution request (media data packets) to the transmission apparatus 101. Here, the term "command execution request" refers to a media data transmission request, an audio data output request, or the like, as mentioned hereinabove. As a transmission protocol, there may be used RTSP, SIP, or a protocol other than these.

A packet reception section 115 receives media data packets transmitted from the transmission apparatus 101. A media data decoding section 116 decodes the media data packets into media data according to methods of decoding the respective media data packets. A media data playback section 117 plays back the decoded media data.

An audio data input section 118 inputs audio data e.g. from a microphone. The input audio data is converted to a digital signal, and then is encoded by an audio data encoding section 119.

FIG. 2 is a diagram of an example of the hardware configuration of the transmission apparatus. As illustrated in FIG. 2, the transmission apparatus 101 includes the CPU, denoted by reference numeral 11, the storage device, denoted by reference numeral 12, and a network interface (I/F) 13.

Figure 3:
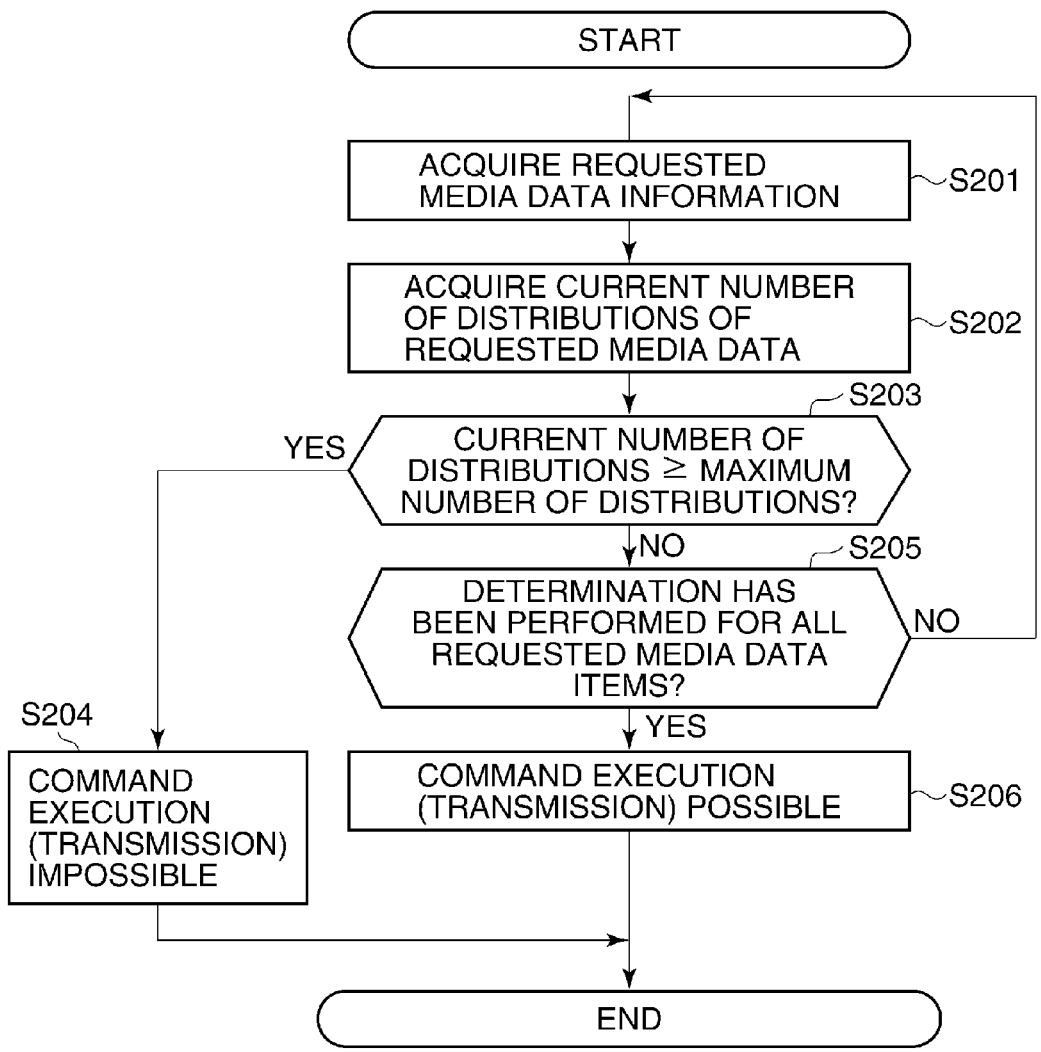
FIG. 3 is a flowchart of a command execution capability determination process executed by a command execution capability determination section appearing in FIG. 1.

The CPU 11 executes programs stored in the storage device 12, to thereby realize the functions of the transmission apparatus 101, shown in FIG. 1, and a command execution capability determination process described hereinafter with reference to FIG. 3. Further, the CPU 11 controls the overall operation of hardware connected to a system bus 14. The storage device 12 is e.g. a RAM, a ROM, an HDD, or the like, which stores programs and also serves as a main memory, a work area of the CPU 11, and so forth. The network interface 13 controls communication with other apparatuses via the network 103.

Note that in first to fourth embodiments of the present invention described hereafter, the imaging apparatus is described as the transmission apparatus 101, and transmits photographed video data to the reception apparatus 102 via the network 103.

Further, it is assumed that the reception apparatus 102 as well has at least the hardware configuration as shown in FIG. 2. More specifically, a CPU of the reception apparatus 102 executes programs stored in a storage device of the reception apparatus 102, to thereby realize the functions of the reception apparatus 102, shown in FIG. 1.

In each of the first to fourth embodiments of the present invention described hereinafter with reference to FIGS. 4 to 12, a plurality of transmission apparatuses 101 each having a server function, and a plurality of reception apparatuses 102 each having a client function are connected to the network 103. In the present embodiment, the reception apparatus 102 realizes the client function by its CPU executing a program stored in the storage device thereof.

Next, a command execution capability determination process executed by the command execution capability determination section 109 will be described with reference to FIG. 3.

The command execution capability determination section 109 acquires requested media data information from the media data transmission request received by the packet reception section 108 (S201). The requested media data information does not necessarily request transmission of one media data item, but it can request transmission of a plurality of media data items, such as video data, audio data, and metadata. When the received media data transmission request contains information on a plurality of requested media data items, the transmission apparatus 101 stores the information on the requested media data items contained in the media data transmission request in the storage device 12. In the step S201, the command execution capability determination section 109 acquires information on one of the plurality of requested media data items.

The command execution capability determination section 109 acquires the current number of distributions of acquired requested media data (S202). Then, the command execution capability determination section 109 compares the current number of distributions of the acquired requested media data and the maximum number of distributions thereof set in advance (S203). In the present embodiment, the maximum number is statically set. However, for example, the command execution capability determination section 109 or the like may dynamically set the maximum number according to the bandwidth of the network or processing load on the CPU 11 of the transmission apparatus 101, or may set a different value for the maximum number of distributions of acquired requested media on a requested media data information item basis.

If the current number of distributions is equal to or larger than the maximum number of distributions (i.e. equal to or larger than a threshold value) (Yes to the step S203), the command execution capability determination section 109 determines that execution of the command (transmission of the requested media data item) is impossible (S204).

On the other hand, if the current number of distributions is smaller than the maximum number of distributions (i.e. smaller than the threshold value) (No to the step S203), it is checked whether or not the determination has been performed for all requested media data items (S205).

If it is determined that the determination has been performed for all requested media data items (Yes to the step S205), the command execution capability determination section 109 determines that execution of the command (transmission of the requested media data item) is possible) (S206). On the other hand, if it is determined that the determination has not been performed for all requested media data items (No to the step S205), the command execution capability determination section 109 returns to the step S201 to acquire a next requested media data item and continue the above-described processing on the next requested media data item. Note that the command execution capability determination section 109 checks, by referring to the requested media data information contained in the media data transmission request, which has been stored in the storage device 12, whether or not the determination has been performed for all requested media data items. Although in the present embodiment, it is determined that the command requested by the reception apparatus 102 cannot be executed unless the current number of distributions of each of all the requested media data items is smaller than the maximum number of distributions thereof, it may be determined that the command can be executed if the current number of distributions of at least one requested media data item is smaller than the maximum number of distributions thereof.

Next, as a first embodiment of the present invention, a description will be given of a method for entrusting execution of a command requested by the reception apparatus 102 (requested command execution) to another transmission apparatus connected to the network, when it is determined that execution of the command is impossible. Although in the present embodiment, a more specific method using RTSP is described, this is not limitative.

Figure 4:
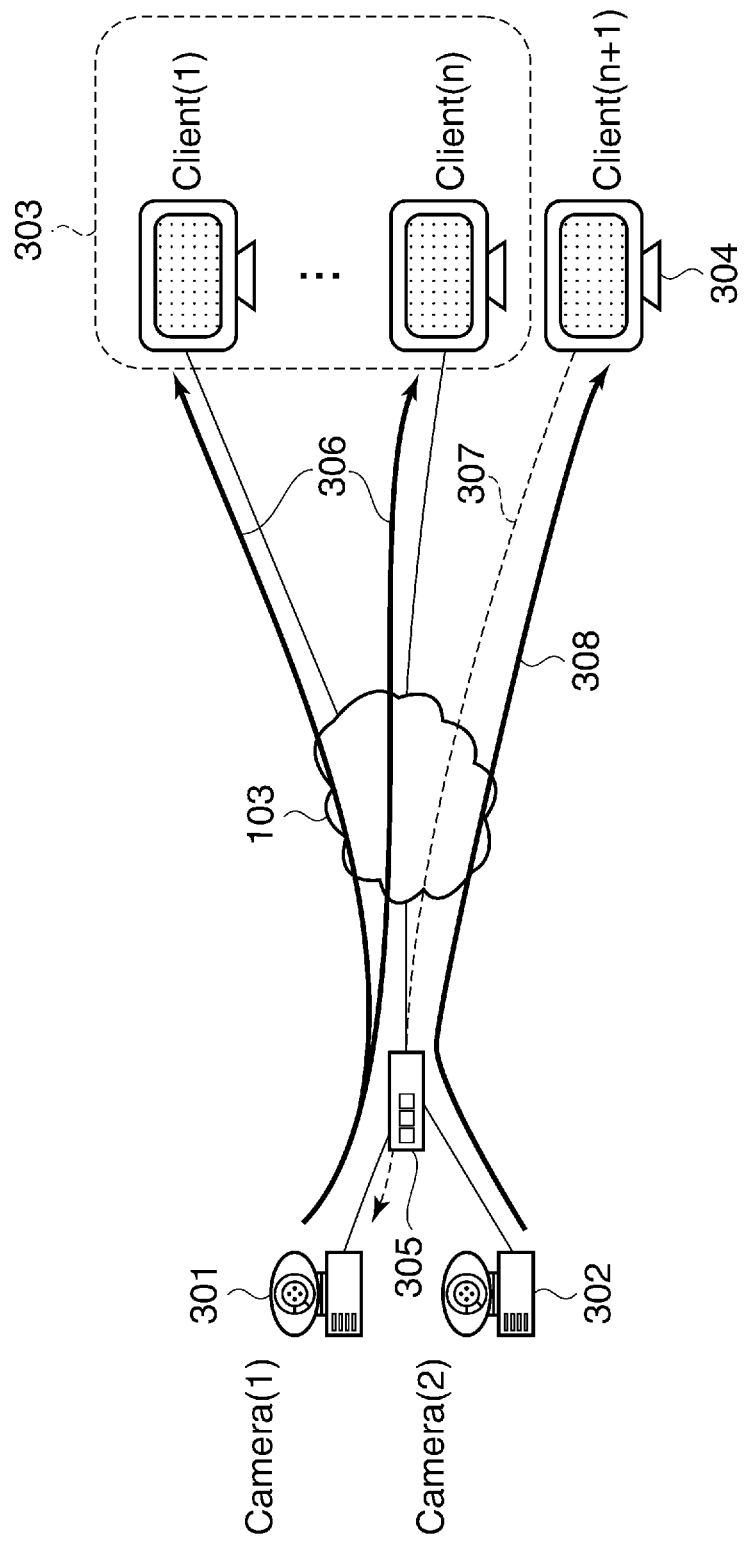
FIG. 4 is a schematic diagram of a system including a transmission apparatus as an imaging apparatus according to a first embodiment of the present invention.

FIG. 4 is a schematic diagram of a system including the transmission apparatuses as imaging apparatuses according to the present embodiment.

In the present system, a camera (1) 301 and a camera (2) 302, which are transmission apparatuses as the imaging apparatuses according to the present embodiment, exist on the same LAN (local area network) through connection to a router 305. Further, a number n of clients 303, which are reception apparatuses, receive photographed media data 306 via the network 103. FIG. 4 shows a state in which a client (n+1) 304, which is a new reception apparatus, has transmitted a media data transmission request to the camera (1) 301 under such conditions. The transmission apparatuses are not necessarily required to exist on the same LAN or are not necessarily required to be connected via the router 305.

Here, it is assumed that the maximum number of distributions of media data items that can be transmitted by the camera (1) 301 is n. The camera (1) 301 is distributing media data to a client group 303 of clients (1) to (n), and is in a state incapable of distributing media data to a client (n+1) 304. At this time, the camera (1) 301 inquires of the camera (2) 302 existing on the same LAN as to whether or not the camera (2) 302 can perform substitute distribution of media data. When it is determined, as a result of the inquiry, that the camera (2) 302 can perform the substitute distribution of media data, the camera (1) 301 transmits media data information including an IP address of the camera (2) 302 to the client (n+1) 304.

The client (n+1) 304 refers to the media data information received from the camera (1) 301, and establishes a session to the camera (2) 302, to thereby receive photographed media data 308 from the camera (2) 302.

Figure 5:
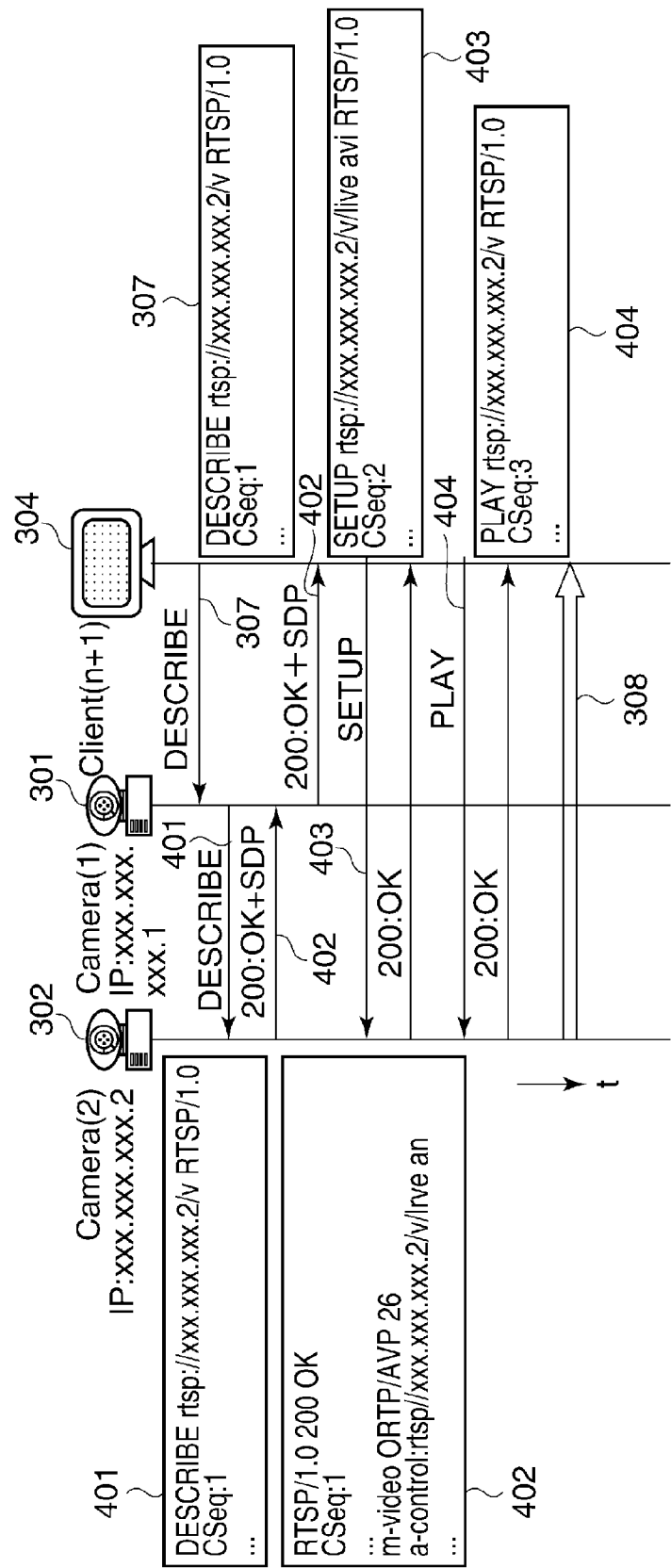
FIG. 5 is a diagram showing an example of details of processing using RTSP, which is executed by the transmission apparatus as the imaging apparatus according to the first embodiment.

Next, an example of details of processing using RTSP, executed by the cameras (1) and (2), which are the transmission apparatuses as the imaging apparatuses according to the first embodiment, will be described with reference to FIG. 5.

Here, an IP address of the camera (1) 301 is set to xxx.xxx.xxx.1. Further, the IP address of the camera (2) 302 is set to xxx.xxx.xxx.2.

The client (n+1) 304 transmits a media data transmission request 307 to the camera (1) 301. To request a media data stream using RTSP, normally, first, the client (n+1) 304 requests media data information based on SDP using the request 307 using the DESCRIBE method. Here, SDP is an abbreviation for Session Description Protocol. This media data information includes a method for encoding video data and audio data, a URL used for requesting the media data stream, and so forth.

Since the camera (1) 301 is in a state incapable of performing new media data transmission, the camera (1) 301 requests the camera (2) 302 to transmit media data information, by a request 401 using the DESCRIBE method.

If the camera (2) 302 is capable of performing new media data transmission, the camera (2) 302 transmits a message 402 comprising SDP data including a success response (200: OK) and the media data information, to the camera (1) 301.

The camera (1) 301 transfers the media data information of the camera (2) 302, received therefrom, to the client (n+1) 304.

The client (n+1) 304 refers to the media data information of the camera (2) 302, received from the camera (1) 301, and transmits a request 403 using the SETUP method for establishing a media session between the client (n+1) 304 and the camera (2) 302, to the camera (2) 302. The media session is established by connection e.g. by RTP/UDP, separately from the RTSP session for session control. The protocol is not necessarily required to be RTP/UDP, and the media data may be encapsulated into data packets by a TCP protocol, such as RTSP or HTTP.

After establishing the media session, the client (n+1) 304 transmits a request 404 using the PLAY method for playback of media data, to the camera (2) 302, and receives the photographed media data 308 from the camera (2) 302.

Figure 6:
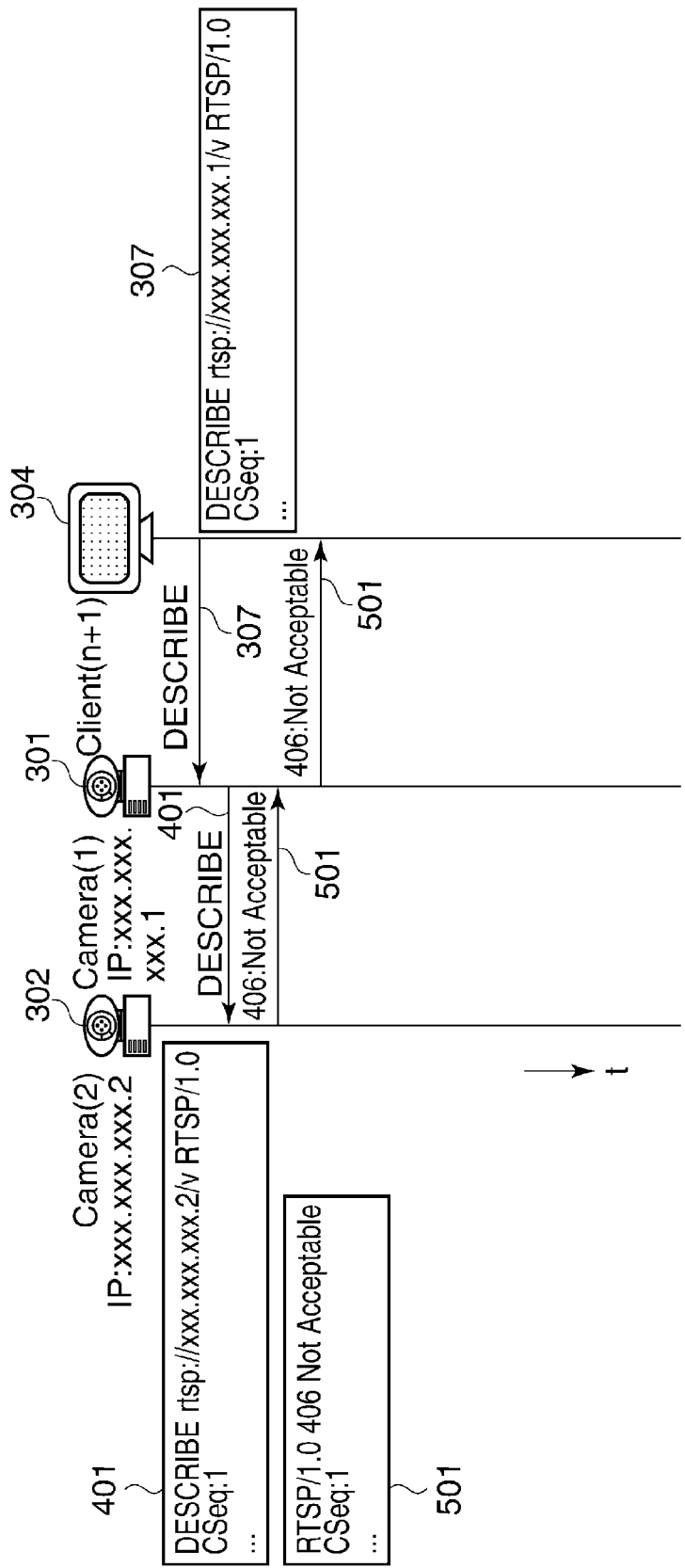
FIG. 6 is a diagram showing an example of processing performed in a case where a second transmission apparatus as well is incapable of transmitting media data.

Next, an example of processing performed in a case where the camera (2) which is the second transmission apparatus as the imaging apparatus according to the first embodiment as well is in a state incapable of transmitting media data will be described with reference to FIG. 6.

The camera (1) 301 having received the media data transmission request 307 from the client (n+1) 304 is in the state incapable of transmitting media data, and hence transmits the request 401 using the DESCRIBE method to the camera (2) 302, which is the second transmission apparatus.

Here, it is assumed that the camera (2) 302 as well is incapable of transmitting media data. In a case where the camera (2) 302 itself stores no information on a second substitute transmission apparatus, the camera (2) 302 transmits an RTSP error response 501, e.g. an error code 406: Not Acceptable, to the camera (1) 301.

In a case where the camera (2) 302 itself stores information on the second substitute transmission apparatus, the camera (2) 302 may request media data information by the request 401 using the DESCRIBE method, similarly to the case where the camera (1) 301 cannot transmit media data.

Upon receipt of RTSP error response (406: Not Acceptable) 501 from the camera (2) 302, the camera (1) 301 may perform the following processing, provided that it holds information on a second substitute transmission apparatus other than the camera (2) 302: The camera (1) 301 may transmit the request using the DESCRIBE method to the second substitute transmission apparatus indicated by the information.

In a case where all substitute transmission apparatuses on which information is held by the camera (1) 301 are in a state incapable of transmitting media data (i.e. execution of the command is impossible), the camera (1) 301 transmits the RTSP error response 501 to the client (n+1) 304. That is, by transmitting the RTSP error response 501 to the client (n+1) 304, the camera (1) 301 rejects the media data transmission request 307. Note that the error code of the RTSP error response 501 is not necessarily required to be 406: Not Acceptable. Further, to determine whether or not media data can be distributed, instead of using the DESCRIBE method, the SETUP method may be used, and the media data transmission request may be rejected (if execution of the command is impossible).

In the present embodiment, the description has been given of the case where the camera (1) 301 acquires media data information from the camera (2) 302, which is the second transmission apparatus, by the request using the DESCRIBE method. However, the camera (1) 301 may be configured to store in advance media data information, and transmit the media data information to the client (n+1) 304 without inquiring the camera (2) 302 as to whether or not it can perform substitute distribution of media data.

Further, although in the present embodiment, the description has been given assuming that a single second transmission apparatus exists, when a plurality of second transmission apparatuses exist, priorities may be assigned thereto e.g. by a predetermined algorithm, to thereby enable an inquiry destination to be determined according to the priorities.

As described hereinabove, in the present embodiment, when the transmission apparatus has received a new media data distribution request from a reception apparatus in a state where the transmission apparatus cannot distribute media data, the transmission apparatus entrusts the distribution of the new media data to a second transmission apparatus. This makes it possible for the reception apparatus to make efficient use of resources without grasping existence of a plurality of transmission apparatuses.

Figure 7:
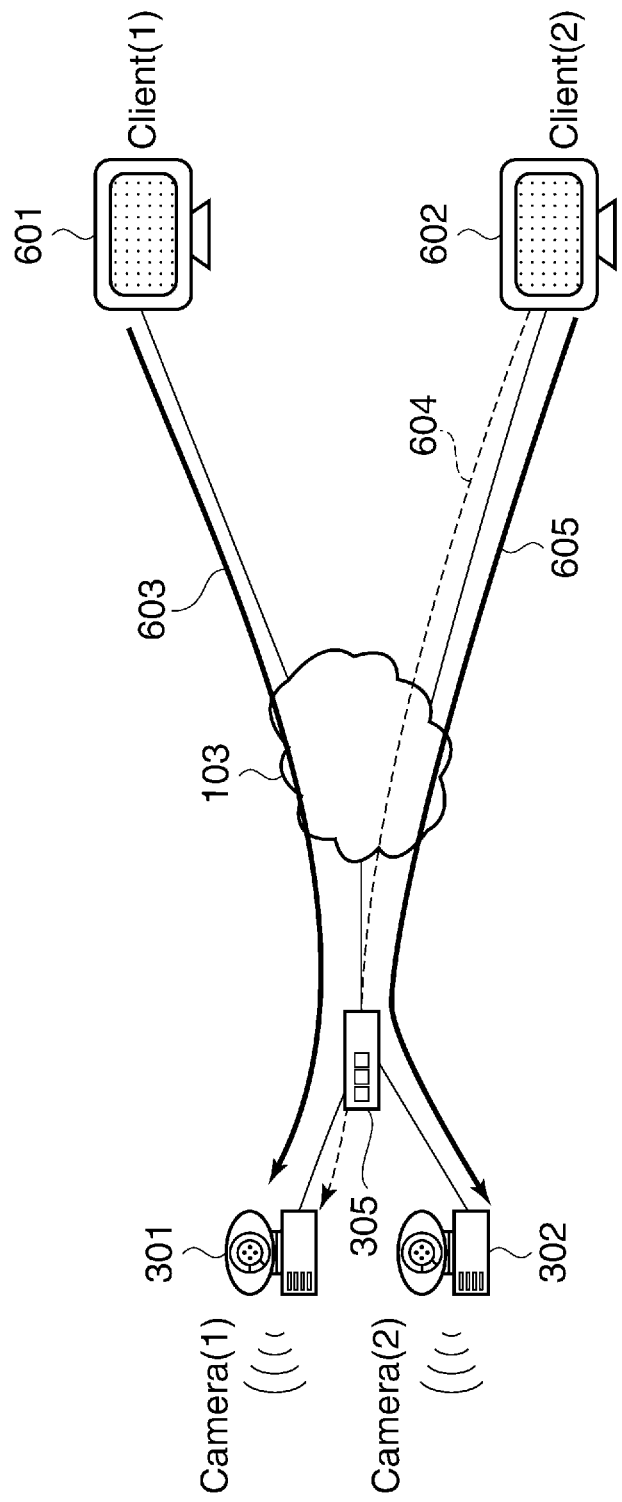
FIG. 7 is a schematic diagram of a system including transmission apparatuses as imaging apparatuses according to a second embodiment of the present invention.

Next, a second embodiment of the present invention will be described. FIG. 7 schematically shows a system including transmission apparatuses as imaging apparatuses according to the second embodiment, in which one of the transmission apparatuses is requested to output audio data by reception apparatuses.

Let it be assumed that the camera (1) 301 and the camera (2) 302, which are transmission apparatuses, are each provided with an interface for outputting audio data, and are capable of outputting audio data received from one of the reception apparatuses. Here, a description will be given of processing performed when the camera (1) 301 has received an audio data output request 604 from a second client (2) 602 when the camera (1) 301 is being outputting audio data 603 received from a client (1) 601.

Figure 8:
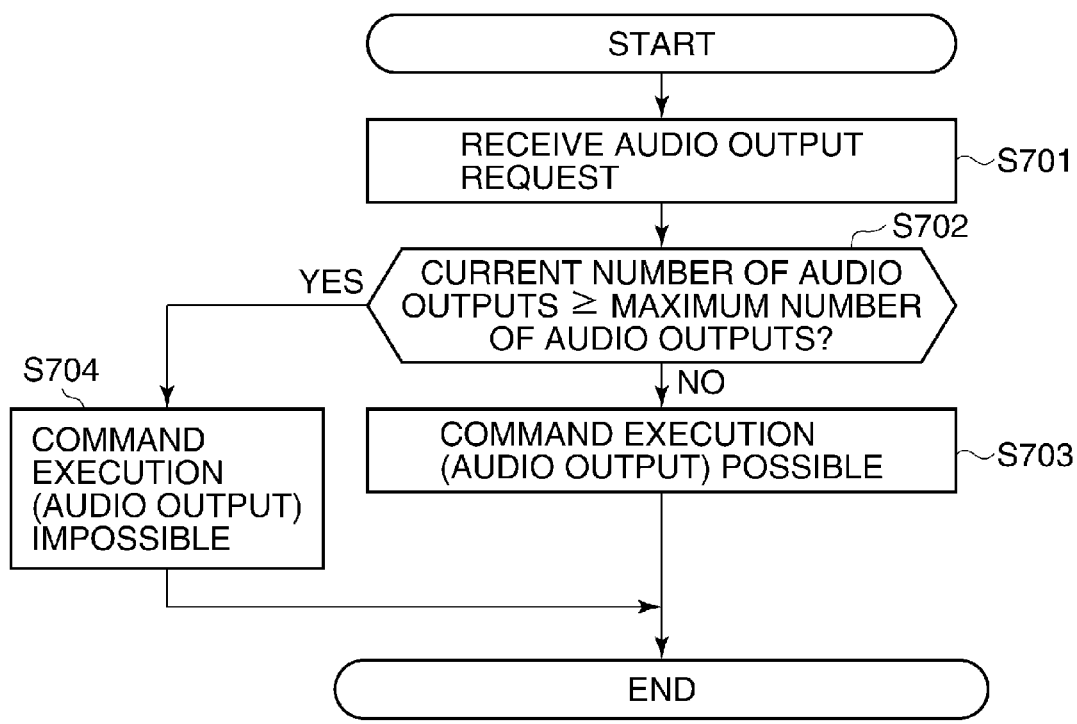
FIG. 8 is a flowchart of a command execution capability determination process executed by a command execution capability determination section.

FIG. 8 is a flowchart of a command execution capability determination process executed by the command execution capability determination section 109.

The command execution capability determination section 109 receives an audio output request from one of the reception apparatuses (S701). Then, the command execution capability determination section 109 compares the current number of audio outputs and the maximum number of audio outputs (=1) (S702).

If the current number of audio outputs is smaller than the maximum number of audio outputs (i.e. smaller than a threshold value) (No to the step S702), the command execution capability determination section 109 determines that the requested audio output can be executed (S703).

On the other hand, if the current number of audio outputs is equal to or larger than the maximum number of audio outputs (i.e. equal to or larger than the threshold value) (Yes to the step S702), the command execution capability determination section 109 determines that the requested audio output cannot be executed (S704).

Although in the present embodiment, the maximum number of audio outputs is set to 1, the maximum number of audio outputs is not limited to 1, e.g. in cases where the transmission apparatuses are equipped with an audio mixer function, a plurality of audio output interfaces, or the like.

Referring to FIG. 7, when the command execution capability determination section 109 determines that the requested audio output (the audio output command) cannot be executed, the camera (1) 301 entrusts the requested audio output to the camera (2) 302, which is a second transmission apparatus connected to the network. The second client (2) 602 transmits audio data 605 to the camera (2) 302.

Figure 9:
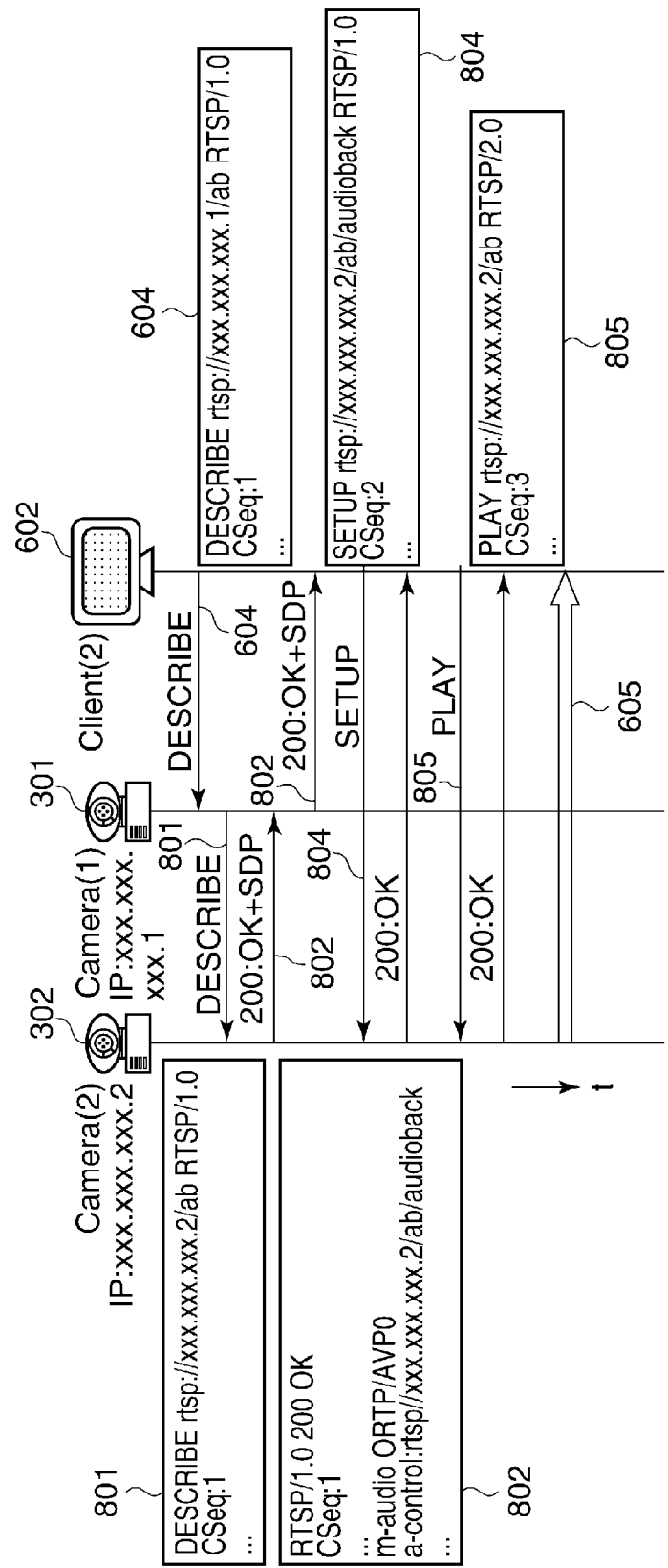
FIG. 9 is a diagram showing an example of details of processing using RTSP, which is executed by a transmission apparatus as an imaging apparatus according to the third embodiment.

Next, an example of details of processing using RTSP, executed by the cameras (1) and (2), which are the transmission apparatuses as the imaging apparatuses according to the second embodiment, will be described with reference to FIG. 9.

The second client (2) 602 transmits the audio data output request 604 to the camera (1) 301 using the DESCRIBE method defined by RTSP.

Here, the camera (1) 301 is already outputting audio data from the client (1) 601, and hence the camera (1) 301 cannot perform a new audio data output requested by the second client (2) 602. Therefore, the camera (1) 301 requests the camera (2) 302 to transmit audio output session information, by a request 801 using the DESCRIBE method.

If the camera (2) 302 can output the audio data, the camera (2) 302 transmits a message 802 comprising SDP data including a success response (200: OK) and audio output session information, to the camera (1) 301.

The camera (1) 301 transfers the message 802 including the audio output session information of the camera (2) 302, received from the camera (2) 302, to the second client (2) 602.

The second client (2) 602 refers to the SDP data including the audio output session information of the camera (2) 302, and transmits a request 804 using the SETUP method for establishing a media session between the second client (2) 602 and the camera (2) 302, to the camera (2) 302.

After establishing the media session, the second client (2) 602 transmits a message 805 using the audio output start request PLAY method to the camera (2) 302, and transmits the audio data 605 to the camera (2) 302.

As described hereinabove, in the present embodiment, when the transmission apparatus has received a new audio data output request from the reception apparatus in a state where the transmission apparatus cannot output audio data, the transmission apparatus entrusts the audio data output to another transmission apparatus. This makes it possible for the reception apparatus to make efficient use of resources without grasping existence of a plurality of transmission apparatuses.

Figure 10:
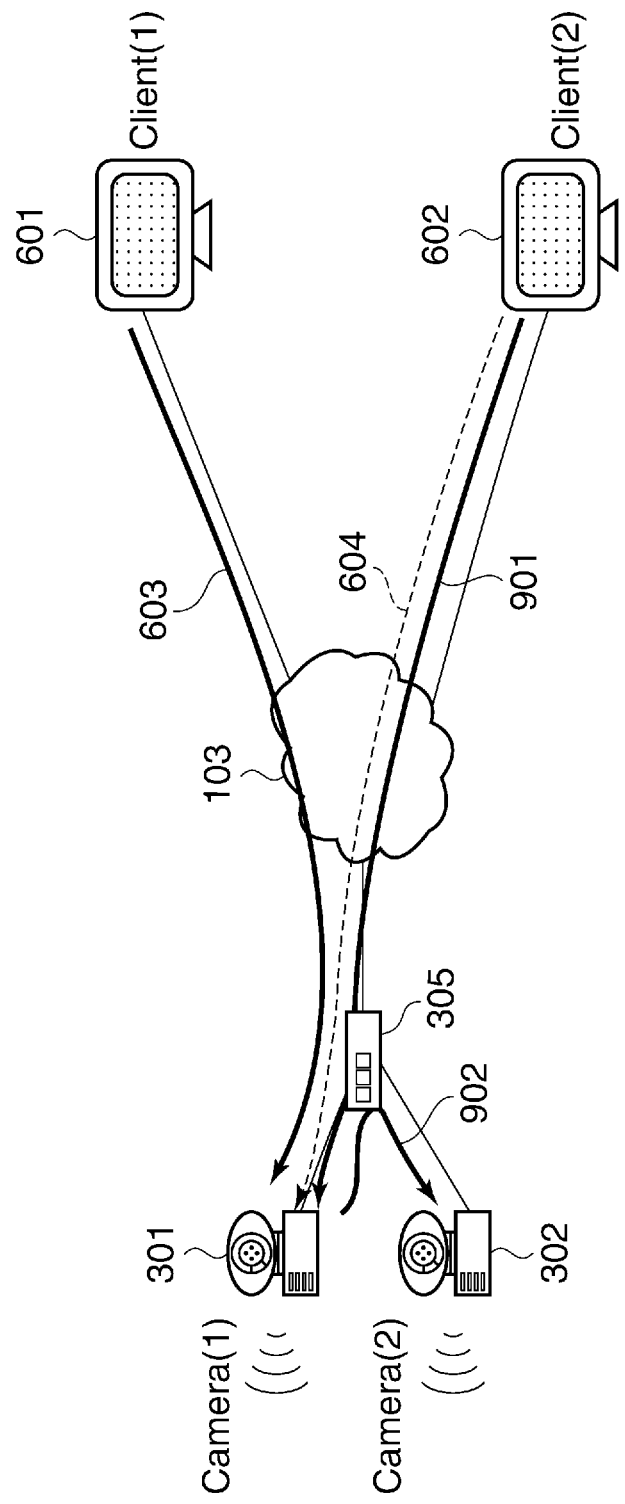
FIG. 10 is a schematic diagram of a system including transmission apparatuses as imaging apparatuses according to a third embodiment of the present invention.

Next, a third embodiment of the present invention will be described. FIG. 10 schematically shows a system including transmission apparatuses as imaging apparatuses according to the third embodiment different from the second embodiment, in which one of the transmission apparatuses is requested to output audio data by reception apparatuses.

Here, a description will be given of processing performed when the camera (1) 301 as one of the transmission apparatuses, which is already outputting audio data received from the client (1) 601 as one of the reception apparatuses, has received an audio data output request 604 from the second client (2) 602 as the other of the reception apparatuses.

When the command execution capability determination section 109 determines that the audio output command cannot be executed, the camera (1) 301 entrusts the requested audio output to the camera (2) 302 as a second transmission apparatus connected to the network. Processing executed by the command execution capability determination section 109 is the same as the processing described in the second embodiment, and hence description thereof is omitted. In the present embodiment, the second client (2) 602 transmits audio data 901 to the camera (1) 301. The camera (1) 301 does not play back the received audio data 901 by itself, but transfers audio data 902 having the same payload as the audio data 901, to the camera (2) 302.

Figure 11:
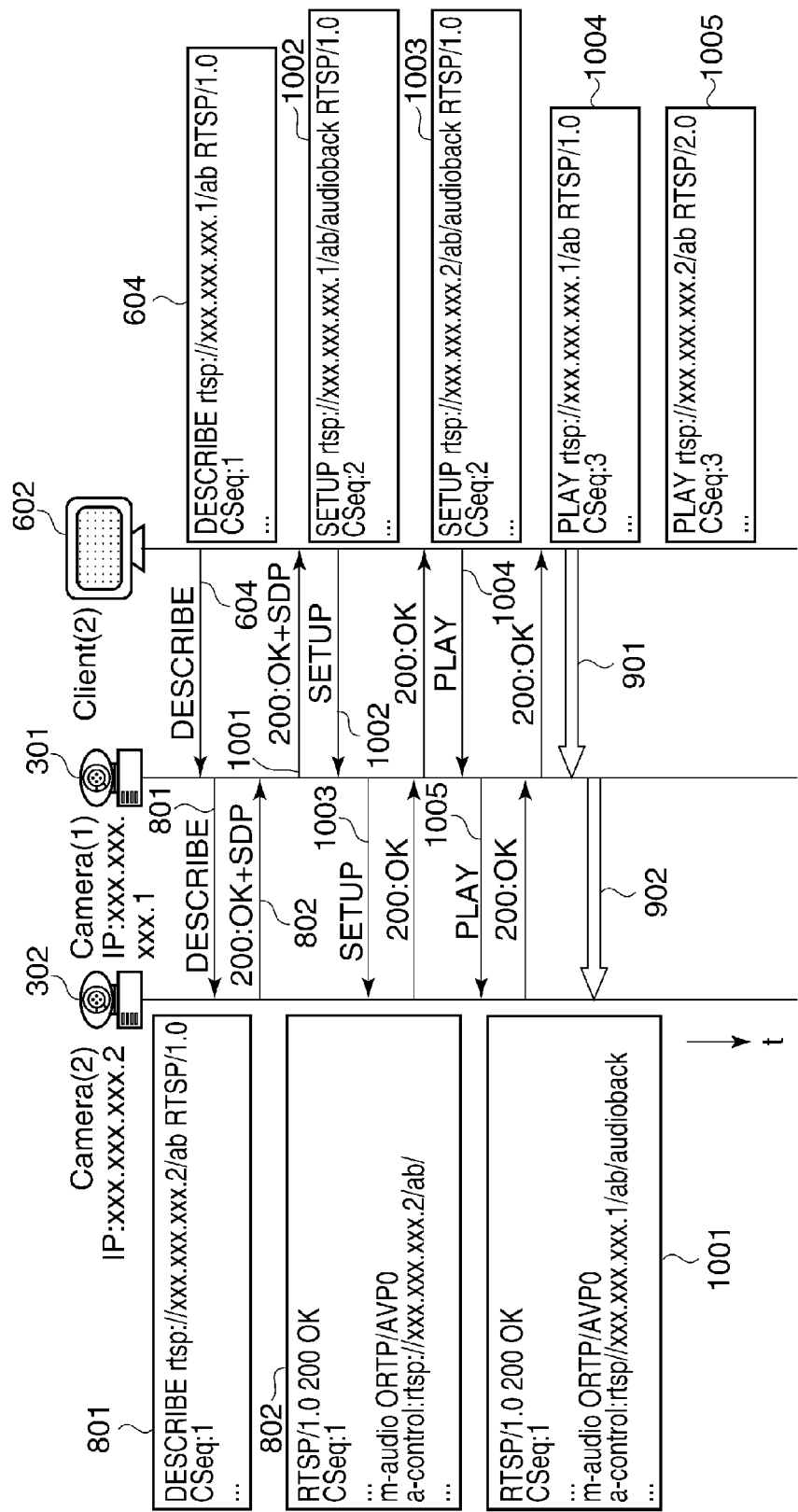
FIG. 11 is a diagram showing an example of details of processing using RTSP, which is executed by a transmission apparatus as an imaging apparatus according to the third embodiment.

Next, an example of details of processing using RTSP, executed by the cameras (1) and (2), which are the transmission apparatuses as the imaging apparatuses according to the third embodiment, will be described with reference to FIG. 11.

The second client (2) 602 transmits the audio data output request 604 using the RTSP DESCRIBE method to the camera (1) 301. Here, the camera (1) 301 is already outputting audio data received from the client (1) 601, and hence the camera (1) 301 cannot perform a new audio data output requested by the second client (2) 602.

Therefore, the camera (1) 301 requests the camera (2) 302 to transmit audio output session information, by a request 801 using the DESCRIBE method.

If the camera (2) 302 can output the audio data, the camera (2) 302 transmits the message 802 comprising SDP data including a success response (200: OK) and the audio output session information, to the camera (1) 301.

The camera (1) 301 transmits, to the client (2) 602, a message 1001 comprising SDP data including audio output session information in which an URL for session control of the camera (2) 302 in the SDP data including the audio output session information of the message 802 is rewritten by an URL for session control of the camera (1) 301 and the success response (200: OK).

The second client (2) 602 refers to the SDP data including the audio output session information in the message 1001 received from the camera (1) 301, and transmits a request 1002 using the SETUP method for establishing a media session between the second client (2) 602 and the camera (1) 301, to the camera (1) 301.

The camera (1) 301 having received the request using the SETUP method 1002 from the second client (2) 602 refers to the SDP data including the audio output session information of the camera (2) 302 in the message 802 received from the camera (2) 302. Then, the camera (1) 301 transmits a request 1003 using the SETUP method for establishing a media session between the camera (1) 301 and the camera (2) 302, to the camera (2) 302. As a result, the second client (2) 602 is in a state having established the media session with the camera (1) 301, while the camera (1) 301 is in a state having established the media session with the camera (2) 302, and the second client (2) 602 and the camera (1) 301 start audio data transmission using requests using the PLAY methods 1004 and 1005, respectively.

When the audio data 901 is transmitted from the second client (2) 602 to the camera (1) 301, the camera (1) 301 transfers the audio data 902 having the same payload as the audio data 901, to the camera (2) 302, and the camera (2) 302 plays back the audio data 902.

As described hereinabove, in the present embodiment, when a transmission apparatus has received a new audio data output request from a reception apparatus, in a state where the transmission apparatus cannot output audio data, the transmission apparatus entrusts the audio data output to a second transmission apparatus. This makes it possible for the reception apparatus to make efficient use of resources without grasping existence of a plurality of transmission apparatuses.

Next, a fourth embodiment of the present invention will be described. In the fourth embodiment, a description is given of a case where a transmission apparatus as an imaging apparatus entrusts execution of a command requested by a reception apparatus to a second transmission apparatus as an imaging apparatus due to shortage of resources, and then, thanks to recovery of resources, the transmission apparatus becomes capable of executing the requested command. Note that processing executed up to a point where the transmission apparatus entrusts the execution of the command requested by the reception apparatus to the second transmission apparatus is the same as in the first embodiment, and hence description thereof is omitted.

Figure 12:
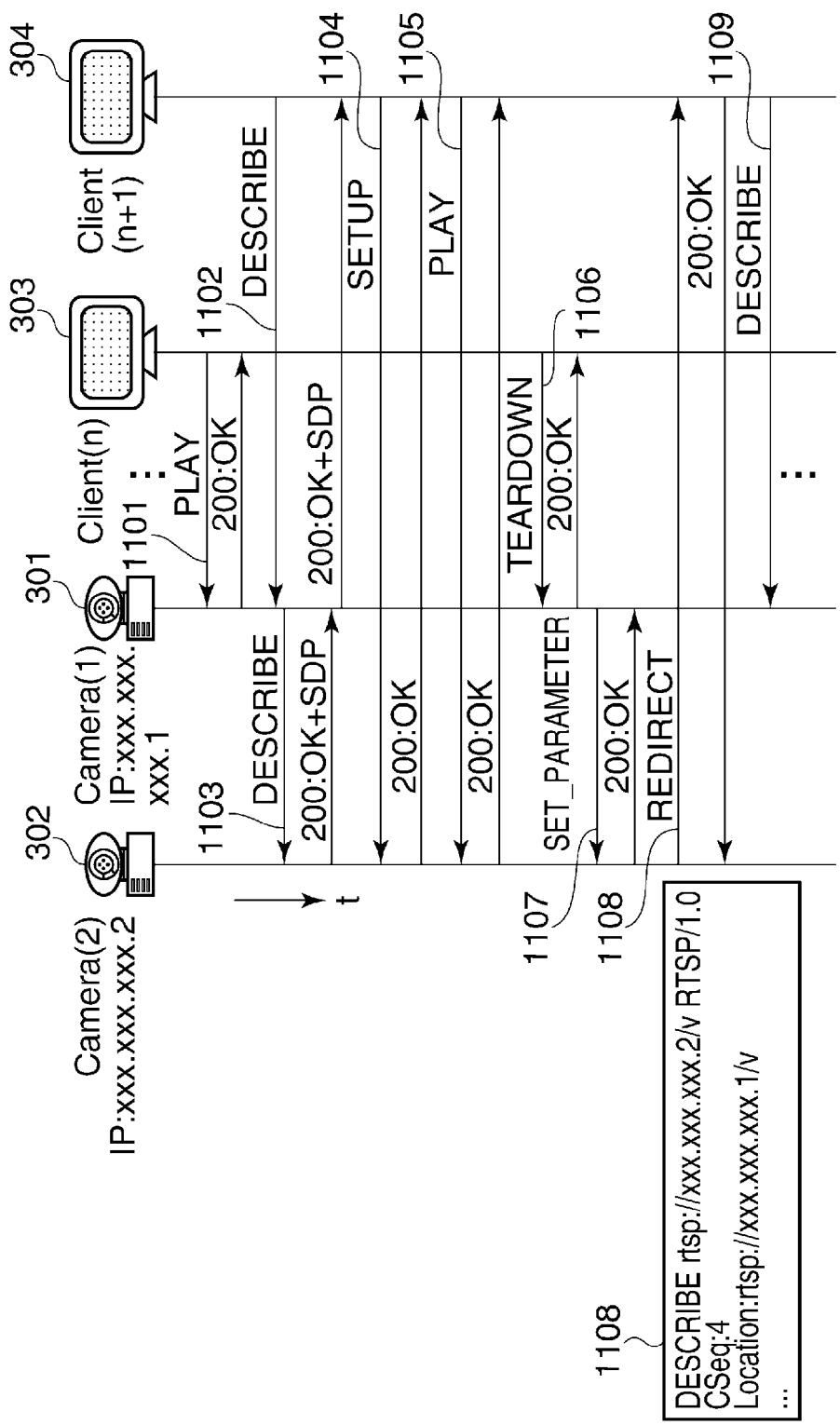
FIG. 12 is a diagram showing an example of details of processing using RTSP, which is executed by a transmission apparatus as an imaging apparatus according to a fourth embodiment of the present invention.

An example of details of processing using RTSP, executed by the cameras (1) and (2), which are transmission apparatuses as imaging apparatuses according to the fourth embodiment, will be described with reference to FIG. 12.

Here, the situation is assumed to be that the camera (1) 301 receives a media data transmission request from a client (n) 303, transmission of media data is started by a request 1101 using the PLAY method, and the camera (1) 301 becomes incapable of performing new media data transmission.

Then, a request 1102 using the DESCRIBE method is transmitted from a client (n+1) 304 to the camera (1) 301 as a new media data transmission request. Next, a sequence of RTSP processing (indicated in FIG. 12 as DESCRIBE 1103-SETUP 1104-PLAY 1105) described in the first embodiment is executed, whereby the camera (1) 301 entrusts media data transmission to the camera (2) 302. Here, the camera (1) 301 stores, in a list, an identifier that enables identification of another camera to which the camera (1) 301 has entrusted execution of a requested command. Any information may be stored in the list insofar as it enables identification of the other camera to which the camera (1) 301 has entrusted execution of the requested command.

Here, the client (n) 303 transmits a request 1106 using the TEARDOWN method to the camera (1) 301, thereby causing the camera (1) 301 to stop playback of the media data. This enables the camera (1) 301 to recover the resources for transmitting media data, whereby the camera (1) 301 becomes capable of performing new media data transmission.

The camera (1) 301 notifies the second camera (2) 302, to which the camera (1) 301 has entrusted execution of the requested command and on which information has been stored in the list, that the camera (1) 301 has become capable of executing the new media data transmission. Although in the present embodiment, the notification is performed a request 1107 using the SET-PARAMETER method defined by RTSP, the notification may be performed by another method or using a protocol other than RTSP.

Upon receipt of the notification of a change in the state from the camera (1) 301, the camera (2) 302, to which the camera (1) 301 has entrusted the media data transmission to the client (n+1), transmits a message 1108 using the REDIRECT method to the client (n+1). The message 1108 using the REDIRECT method includes an access URL to the camera (1) 301 to which the client (n+1) is to be reconnected, as Location.

The client (n+1) refers to the message 1108 using the REDIRECT method received from the camera (2) 302, and transmits a media data transmission request 1109 using the DESCRIBE method to the camera (1) 301 anew.

As described hereinabove, in the present embodiment, after a transmission apparatus entrusts media data transmission requested from a reception apparatus to a second transmission apparatus, the transmission apparatus becomes capable of performing new media data transmission thanks to recovery of the resources. In this case, the transmission apparatus notifies the second transmission apparatus that it can execute the new media data transmission. This makes it possible for the reception apparatus to receive as much media data as possible from the transmission apparatus originally desired by the reception apparatus, while making efficient use of the resources of a plurality of transmission apparatuses.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

As described hereinabove, in the above-described embodiments, when a transmission apparatus has received a new command execution request from a reception apparatus in a state where the transmission apparatus cannot execute a requested command, the transmission apparatus entrusts the command execution to a second transmission apparatus. This makes it possible for the reception apparatus to make efficient use of resources without grasping the network structure of a plurality of transmission apparatuses.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2012-084252 filed Apr. 2, 2012, which is hereby incorporated by reference herein in its entirety.

What is claimed is:

1. An imaging apparatus connected to another imaging apparatus and a reception apparatus via a network, comprising:
a reception section configured to receive a transmission request requesting transmission of first video data photographed by the imaging apparatus to the reception apparatus, from the reception apparatus;
a determination section configured to determine, based on processing load on the imaging apparatus, a distribution capacity of the imaging apparatus, or conditions of the network, whether or not the imaging apparatus is to execute transmission processing for transmitting the first video data to the reception apparatus; and
an acquisition section configured to acquire, in a case where said determination section has determined that the imaging apparatus is not to execute the transmission processing, a transmission destination to which a request for acquiring second video data photographed by said another imaging apparatus is to be transmitted.

2. The imaging apparatus according to claim 1, further comprising a notification section configured to notify, in a case where said determination section has determined that the imaging apparatus is not to execute the transmission processing, the transmission destination acquired by said acquisition section to the reception apparatus which has made the transmission request.

3. The imaging apparatus according to claim 1, wherein said determination section determines that the imaging apparatus is to execute the transmission processing in a case where the number of reception apparatuses to which the imaging apparatus is transmitting the video data is less than a predetermined threshold value, and that the imaging apparatus is not to execute the transmission processing in a case where the number of reception apparatuses to which the imaging apparatus is transmitting the video data is not less than the predetermined threshold value.

4. The imaging apparatus according to claim 1, further comprising:
an inquiry section configured to inquire said another imaging apparatus whether or not said another imaging apparatus is to execute transmission processing for transmitting the second video data to the reception apparatus; and
a transmission section configured to transmit, in a case where the imaging apparatus is not to execute the transmission processing for transmitting the first video data to the reception apparatus and where said another imaging apparatus is to execute the transmission processing for transmitting the second video data to the reception apparatus, the transmission destination acquired by said acquisition section to the reception apparatus which has transmitted the transmission request.

5. The imaging apparatus according to claim 1, further comprising:

an inquiry section configured to inquire said another imaging apparatus whether or not said another imaging apparatus is to execute transmission processing for transmitting the second video data to the reception apparatus; and a transmission section configured to transmit, in a case where the imaging apparatus is not to execute the transmission processing for transmitting the first video data to the reception apparatus and where said another imaging apparatus is not to execute the transmission processing for transmitting the second video data to the reception apparatus, a response indicating that the transmission request is not to be complied with, to the reception apparatus which has made the transmission request.

6. A method of processing information by an imaging apparatus connected to another imaging apparatus and a reception apparatus, via a network, comprising:

receiving a transmission request requesting transmission of first video data photographed by the imaging apparatus to the reception apparatus, from the reception apparatus;

determining, based on processing load on the imaging apparatus, a distribution capacity of the imaging apparatus, or conditions of the network, whether or not the imaging apparatus is to execute transmission processing for transmitting the first video data to the reception apparatus; and acquiring, in a case where said determining has determined that the imaging apparatus is not to execute the transmission processing, a transmission destination to which a request for acquiring second video data photographed by said another imaging apparatus is to be transmitted.

7. The method according to claim 6 further comprising notifying, in a case where said determining has determined that the imaging apparatus is not to execute the transmission processing, the transmission destination acquired by said acquiring to the reception apparatus which has made the transmission request.

8. A non-transitory computer-readable storage medium storing a computer-executable program for causing a computer to execute a method of processing information by an imaging apparatus connected to another imaging apparatus and a reception apparatus, via a network, wherein the method comprises:

receiving a transmission request requesting transmission of first video data photographed by the imaging apparatus to the reception apparatus, from the reception apparatus;

determining, based on processing load on the imaging apparatus, a distribution capacity of the imaging apparatus, or conditions of the network, whether or not the imaging apparatus is to execute transmission processing for transmitting the first video data to the reception apparatus; and acquiring, in a case where said determining has determined that the imaging apparatus is not to execute the transmission processing, a transmission destination to which a request for acquiring second video data photographed by said another imaging apparatus is to be transmitted.

9. The non-transitory computer-readable storage medium according to claim 8, wherein the method further comprises notifying, in a case where said determining has determined that the imaging apparatus is not to execute the transmission processing, the transmission destination acquired by said acquiring to the reception apparatus which has made the transmission request.

* * * * *